United States Patent [19]
Buhrmann et al.

[11] Patent Number: 5,950,125
[45] Date of Patent: Sep. 7, 1999

[54] LOCATION-DEPENDENT CELLULAR SERVICE PROFILE

[75] Inventors: Michael Buhrmann; Eamon O'Leary, both of Redmond; Elaine I. Sze, Kirkland, all of Wash.

[73] Assignee: AT&T Wireless Services, Kirkland, Wash.

[21] Appl. No.: 08/603,290

[22] Filed: Feb. 20, 1996

[51] Int. Cl.$^6$ .................................................. H04Q 7/20
[52] U.S. Cl. ........................................... 455/422; 455/443
[58] Field of Search ..................................... 455/405, 406, 455/408, 410, 411, 414, 456, 435, 443, 449, 422, 444

[56] References Cited

U.S. PATENT DOCUMENTS

| | | | |
|---|---|---|---|
| 5,640,677 | 6/1997 | Karlsson | 455/444 |
| 5,711,002 | 1/1998 | Foti | 455/433 |

*Primary Examiner*—Dwayne D. Bost
*Assistant Examiner*—Jean A. Gelin

[57] ABSTRACT

Improved communication service methods operate in conjunction with a wireless communications network that includes a plurality of cells, microcells, and/or picocells. A user zone is defined as including one or more cells, microcells, picocells, and/or one or more cell, microcell, and/or picocell sectors. A first set of communication features are provided within the user zone, and a second set of communication features are provided outside the user zone. According to an embodiment disclosed herein, a mobile telephone switching office (MTSO), coupled to the user zone, stores a user zone profile identifying the cells, picocells, microcells, picocell sectors, microcell sectors, and cell sectors included in the user zone. The MTSO selectively modifies a service profile for a cellular telephone if (I) that cellular telephone is situated within the user zone, and optionally (ii) that cellular telephone is authorized for that user zone. The service profile includes (i) an identification number identifying the cellular telephone, (ii) a feature specification indicative of whether or not each of one or more cellular telephone service features are to be performed, and/or specifying one or more operating parameters of cellular service, and (iii) a user zone specification indicating one or more user zones for which the cellular telephone is authorized.

38 Claims, 4 Drawing Sheets

FIG. 2

| 201 | SERVICE PROFILE | | |
|---|---|---|---|
| 203 | MIN FIELD | MOBILE IDENTIFICATION NUMBER :609-658-8345 | |
| 205 | ESN FIELD | ELECTRONIC SERIAL NUMBER: 00747698 | |
| 207 | SERVICES FIELD | CALL FORWARDING - ENABLED ? | Y |
| | | CONFERENCE CALLING - ENABLED ? | N |
| | | CALL WAITING - ENABLED ? | N |
| | | THREE-WAY CALLING - ENABLED ? | Y |
| 209 | CREDIT FIELD | BAD CREDIT ? | N |
| 211 | PIC FIELD | PRIMARY INTEREXCHANGE CARRIER: AT&T | |
| 213 | CALL FORWARDING FIELD | CALL FORWARDING TELEPHONE #: 908-653-4297<br>CALL FORWARDING TELEPHONE #: 919-727-5924 | |
| 215 | USER ZONE FIELD | FIRST USER ZONE | |
| | | FOURTH USER ZONE | |
| | | THIRD MTSO | |
| 217 | MTSO FIELD | HOME MTSO DESIGNATION: FIRST MTSO | |
| 219 | USER ZONE PRIORITY TABLE | FIRST USER ZONE: SECOND PRIORITY | |
| | | FOURTH USER ZONE: FIRST PRIORITY | |

FIG. 3

| 301 | USER ZONE PROFILE<br>USER ZONE IDENTIFIER: THIRD USER ZONE | | |
|---|---|---|---|
| ZONE SPECIFIERS 303 | SECOND CELL SITE - ENTIRE CELL | | |
| | FOURTH CELL SITE - SOUTHEAST SECTOR, 90° TO 180° | | |
| | THIRD CELL SITE - NORTHEAST SECTOR, 0° TO 90° | | |
| | THIRD CELL SITE - SOUTHEAST SECTOR, 90° TO 180° | | |
| 305 | SERVICE PROFILE MODIFICATIONS FIELD | SERVICE PROFILE IDENTIFIER | MODIFICATION FIELD |
| | | SERVICE PROFILE IDENTIFIER | MODIFICATION FIELD |
| | | ⋮ | ⋮ |
| | 307 | 309 | 311 |

LOCATION-DEPENDENT CELLULAR SERVICE PROFILE

BACKGROUND OF THE INVENTION

1. Field of the Invention

The invention relates generally to cellular telephony, and more specifically to the customization of various cellular telephone service features for specific subscribers.

2. Background Art

Many aspects of existing cellular service are customized to meet the needs of specific subscribers. For example, subscribers must designate a preferred carrier for long-distance telephone calls, oftentimes referred to as the primary inter-exchange carrier (PIC). Subscribers may also choose to implement optional features such as conference calling, call waiting, and/or call forwarding. The specific features and characteristics of a given subscriber's cellular telephone service are specified in the form of a service profile data structure stored at the home mobile telephone switching office (MTSO) of the cellular subscriber. The service profile includes a MIN field designating the mobile identification number (telephone number) of the cellular telephone, an ESN field designating the electronic serial number of the telephone, a services field specifying whether or not each of a plurality of features (call forwarding, conference calling, etc.) are to be performed, a credit field specifying the financial credit rating of the cellular subscriber, a PIC field designating the primary inter-exchange carrier, and a call forwarding field specifying one or more call forwarding numbers.

Oftentimes, a cellular subscriber is situated outside the coverage area of the home MTSO cell sites, and requires service from a cell site of a remote MTSO. The remote MTSO instructs the home MTSO to send a copy of the subscriber's service profile to the remote MTSO and places it into a temporary memory register. Thus, all features available to the subscriber at the home MTSO become available at the remote MTSO (assuming that the remote MTSO is equipped to implement such features). In this manner, irrespective of location, the subscriber will access the same primary inter-exchange carrier and will have the same call-forwarding features.

A method of providing a location-dependent person locator service is disclosed in U.S. Pat. No. 4,752,951 issued to Konneker on Jun. 21, 1988. A database is employed to store a plurality of potential locations for a given telephone subscriber. Each of these potential locations is associated with a corresponding call treatment specification setting forth the manner in which an incoming call is to be handled. In response to an incoming telephone call, the data base is addressed to determine the present location of that subscriber, along with the call treatment specification for that location. The incoming call is then handled in accordance with the call treatment specification. For example, the database may specify that calls received while the subscriber is at remote location "A" are to be directed to the subscriber's home telephone number, whereas calls received while the subscriber is at remote location "B" are to be directed to the subscriber's personal pager.

SUMMARY OF THE INVENTION

Improved communication service methods operate in conjunction with a wireless communications network that includes a plurality of cells, microcells, and/or picocells. A user zone is defined as including one or more cells, microcells, picocells, and/or one or more cell, microcell, and/or picocell sectors. According to one embodiment disclosed herein, a first set of communication features are provided within the user zone, and a second set of communication features are provided outside the user zone. According to another embodiment, a first billing rate is applied to a cellular telephone situated within the user zone, and a second billing rate is applied to this cellular telephone when it is situated outside the user zone.

According to a further embodiment disclosed herein, a mobile telephone switching office (MTSO), coupled to the user zone, stores a user zone profile identifying the cells, picocells, microcells, picocell sectors, microcell sectors, and cell sectors included in the user zone. The MTSO selectively modifies a service profile for a cellular telephone if that cellular telephone is situated within the user zone. Optionally, the MTSO selectively modifies the service profile for a cellular telephone only if (a) that cellular telephone is situated within the user zone, and (b) that cellular telephone is authorized for that user zone. In an alternate embodiment, the MTSO does not modify the service profile if the cellular telephone is in the user zone (and authorized for that user zone, when optional step (b) is invoked), but the MTSO modifies the service profile if the cellular telephone is not in the user zone, and/or if the cellular telephone is not authorized for that user zone.

Pursuant to another embodiment, the MTSO modifies the service profile for all cellular telephones in a given user zone, regardless of whether or not the cellular telephone is authorized for that user zone. In a variation of this embodiment, an interactive voice response system and/or message delivery system is coupled to the MTSO. When a cellular telephone establishes communications with the MTSO from within a user zone, the MTSO does not modify the service profile of the cellular telephone, but instead instructs the interactive messaging system and/or message delivery system to provide the cellular telephone with a message. The message is delivered automatically, and/or the interactive messaging system provides the subscriber with the option of accessing the message or not accessing the message. In this manner, a message specifically tailored to the characteristics of a given user zone, such as a traffic report, a weather-related warning, or an advertisement for a local establishment, may be delivered to cellular subscribers.

According to an additional embodiment, the MTSO stores user zone profiles for a plurality of user zones including a first user zone and a second user zone. When a cellular telephone is situated within the first user zone, an MTSO coupled to the first user zone performs a first set of modifications on the service profile and, when the cellular telephone is situated within the second user zone, an MTSO coupled to the second user zone performs a second set of modifications on the service profile. In this manner, the features and/or billing rates specified by the service profile are customized for use at each of a plurality of specific locations.

The service profile described in connection with the foregoing embodiments includes (i) an identification number identifying the cellular telephone, (ii) a feature specification indicative of whether or not each of one or more cellular telephone service features are to be performed, and/or specifying one or more operating parameters of cellular service, and (iii) a user zone specification indicating one or more user zones for which the cellular telephone is authorized. The service profile may, but need not, include a billing rate specification setting forth a billing rate to be applied to the cellular telephone, and this optional billing rate specification may associate each of a plurality of user zones with a corresponding billing rate to be applied when the cellular telephone is in that user zone.

Modifications to the service profile in a user zone may be employed to effect the following illustrative changes in communications service. For example, within a specific user zone, a subscriber is billed at a different rate than if situated outside the user zone. A given subscriber may be provided with cellular service only if the subscriber is situated within a specific user zone.

A still further embodiment equips a cellular telephone with a display device for displaying a location identifier and/or a location indicator. The location identifier and/or location indicator provides a display indication as to whether or not the subscriber's cellular telephone is situated within the user zone. When a call is in progress and a subscriber crosses a user zone boundary, for example, by entering a user zone, leaving a user zone, or crossing from one user zone to another user zone, the MTSO associated with the user zone causes an in-band tone to be transmitted to the subscriber's cellular telephone, notifying the subscriber that a user zone boundary has been traversed. The MTSO optionally generates a new billing record as a user zone boundary is crossed, thereby reflecting a change in the subscriber billing rate.

BRIEF DESCRIPTION OF THE DRAWINGS

FIGS. 2 and 3 are data structure diagrams setting forth the data structures that are utilized by the system of FIG. 1.

DETAILED DESCRIPTION

Figure 1:
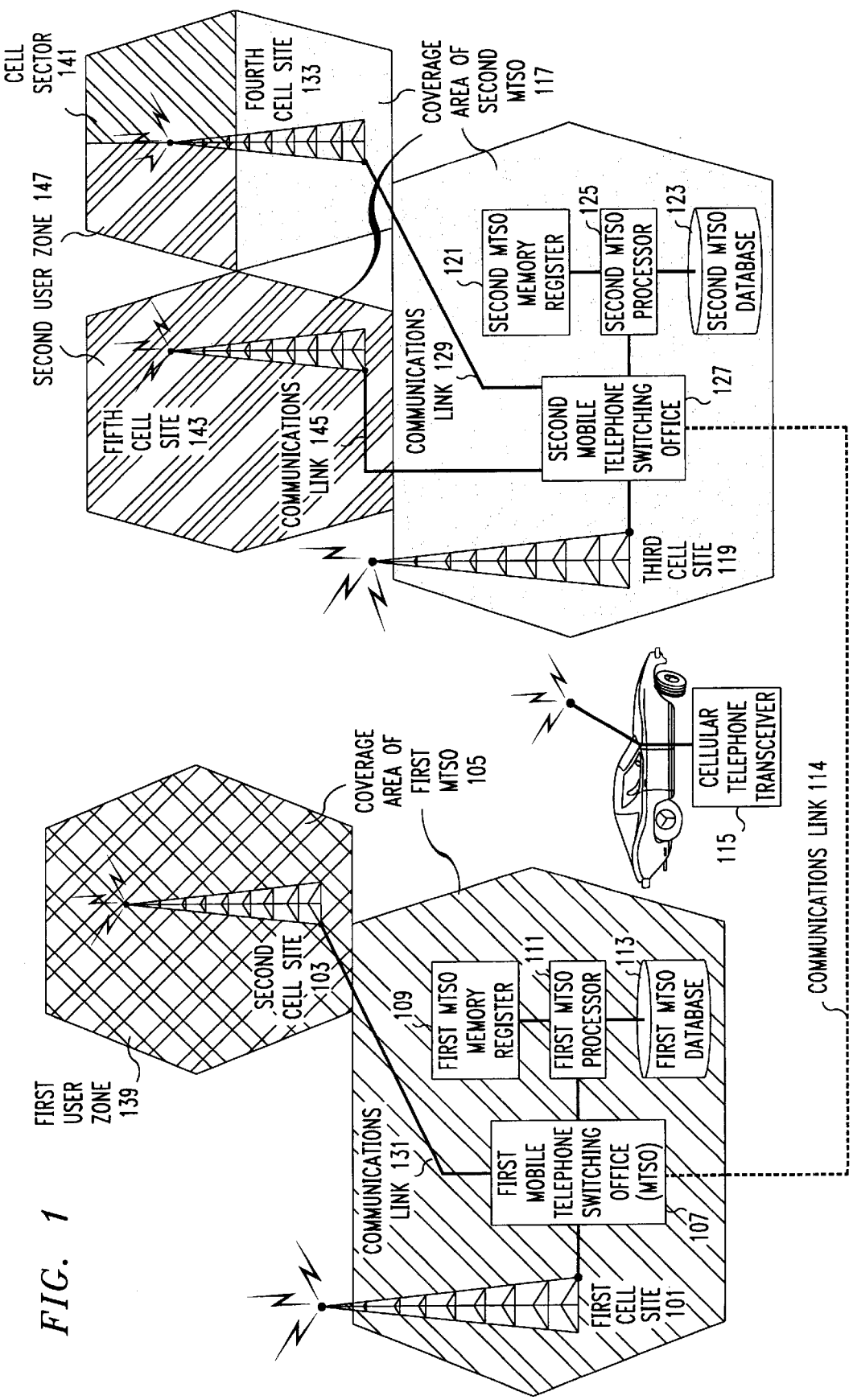
FIG. 1 is a hardware block diagram showing the overall operational environment of an embodiment of the invention disclosed herein.

The existing cellular network generally provides subscribers with the same features and service parameters independent of location. Nevertheless, cellular subscribers do not necessarily wish to access the same primary inter-exchange carrier, and/or have access to the same call-forwarding features independent of location. At some locations, the subscriber may desire long-distance service from a first primary inter-exchange carrier, whereas, at other locations, the subscriber may wish to use another primary inter-exchange carrier. Moreover, the subscriber may desire different sets of cellular features at different locations. For example, the subscriber may wish to use the inter-exchange carrier that offers the most economical service at a given location. Similarly, a subscriber may wish to have a discounted billing rate applied to cellular calls when the subscriber is situated within a given area. A subscriber placing business-related calls from a large corporate complex may wish to have such calls billed to the corporation at a first billing rate, but this subscriber may also wish to have calls placed from the same cellular telephone billed to his or her home address at a second billing rate if such calls do not take place within the corporate complex. In such a case, a user zone may be defined as the corporate complex.

The techniques described in the Konneker patent do not relate to providing location-dependent calling features or location-dependent cellular service parameters. Rather, the Konneker patent relates to the divergent treatment of incoming calls that are intended for a given subscriber. These techniques are not applicable to outgoing calls placed by a subscriber. Rather, the subscriber has to be in the call state. More specifically, no mechanism is described for providing location-dependent services and/or features to calls placed on a given wireless telephone. Services and features such as designation of a primary inter-exchange carrier, call waiting, conference calling, the specification of call forwarding parameters for calls that are to be forwarded from a given telephone, and customer billing are implemented independent of the location of the telephone device used to initiate a call. For example, pursuant to the Konneker method, if a subscriber call is forwarded to a remote telephonic device, no service or feature parameters of this remote telephonic device are changed. The primary inter-exchange carrier accessed by that remote telephonic device will not be modified, nor will the subscriber be able to access a customized set of features from that remote telephonic device. Essentially, the Konneker patent discloses a call forwarding scheme, and not a method for providing location-dependent services.

According to various embodiments disclosed herein, cellular subscribers access a first set of features from a first set of locations and a second set of features from a second set of locations. The first set of locations is defined as a user zone. The first set of features and the second set of features relate to cellular service parameters which are set forth in a service profile corresponding to a given cellular subscriber and/or a given cellular telephone. These features include, for example, specifying a preferred primary inter-exchange carrier, selecting call forwarding parameters, and enabling a call waiting function. According to another embodiment, cellular subscribers access a first billing rate from a first set of locations and a second billing rate from a second set of locations. The first set of locations is defined as a user zone. The first billing rate and the second billing rate relate to cellular service parameters which may be set forth in a service profile corresponding to a given cellular subscriber and/or a given cellular telephone. However, the cellular service profile need not include any service parameters relating to billing rates. A processor at the mobile telephone switching office (MTSO) serving a given user zone may be programmed to apply the appropriate billing rates for all user zones within that MTSO, and to apply the proper billing rates to areas within that MTSO but not within any user zone.

A user zone is defined as including one or more microcells, picocells, and/or cells, and/or one or more microcell sectors, picocell sectors, and/or cell sectors. In this manner, the subscriber may select different feature sets at different geographic locations to customize the subscriber's cellular service.

Refer now to FIG. 1, which is a hardware block diagram showing the overall operational environment of an embodiment of the invention disclosed herein. FIG. 1 depicts a wireless telephonic communications system which, in the present example, includes a first cell site 101, a second cell site 103, a third cell site 119, a fourth cell site 133, and a fifth cell site 143. A first mobile telephone switching office (first MTSO) 107 is at the first cell site 101, and this first MTSO 107 is coupled to second cell site 103 via a communications link 131. However, first MTSO 107 could, alternatively, be located at second cell site 103, or situated at a location physically removed from both the first cell site 101 and the second cell site 103, so long as first MTSO 107 is coupled to both first cell site 101, as well as second cell site 103.

In the present example, a first user zone 139 is defined as including the entire coverage area of second cell site 103.

However, the first user zone could alternatively include the entire coverage area of the first MTSO 105, or a portion of the coverage areas of the first cell site 101 and the second cell site 103, or a portion of the coverage area of the second cell site 103 and the fifth cell site 143, even though the second cell site 103 and the fifth cell site 143 are not served by the same MTSO. Other definitions are possible for first user zone 139, so long as the user zone boundaries are based upon cell, microcell, and/or picocell boundaries, and/or cell sector, microcell sector, and/or picocell sector boundaries. To illustrate this concept more particularly, a second user zone 141 has been defined as including a sector of the coverage area of the fourth cell site 133.

In circumstances where the first MTSO 107 is remotely situated with respect to a particular cell site, that cell site may be linked to the first MTSO via a communications pathway such as communications link 131. Communications link 131 may represent a wireless communications link or the like, a wired communications link or the like, a fiber-optic link, or any combination of the aforementioned types of links. A region termed the "coverage area of first MTSO 105" includes the combined coverage areas of first cell site 101 and second cell site 103. If other cell sites in addition to first cell site 101 and second cell site 103 are coupled to first MTSO 107, the coverage areas of these other cell sites may also be incorporated into the coverage area of first MTSO 105. First MTSO 107 includes two cell sites for illustrative purposes only, it being understood that first MTSO may actually include more than two cell sites, or, alternatively, only one cell site.

First cell site 101 and/or second cell site 103 may each be equipped to provide coverage substantially throughout a conventionally-sized cell that typically covers a radius of about 0.5 to 10 miles. However, one or both of the first cell site 101 and the second cell site 103 may represent a microcell or a picocell having a coverage area effectively limited, for example, to an office building or a shopping mall.

Any of the cell sites, including first cell site 101 and/or fourth cell site 133, may optionally be divided into a plurality of sectors. Sectorization may be utilized in conjunction with virtually any type of cell, picocell, or microcell. To this end, a plurality of directional antenna arrays are employed, for example, at fourth cell site 133, wherein the main lobe of a respective array is directed towards a corresponding azimuth range in a horizontal plane. Assuming that four directional antenna arrays are employed at fourth cell site 133, the main lobe of a first directional antenna array may be equipped to provide service in a Northeasterly direction from fourth cell site 133, from about 0 degrees true North to 90 degrees East of North, a second directional antenna array may be equipped to provide service in a Southeasterly direction from fourth cell site 133, from 90 degrees to 180 degrees, etc. In this example, fourth cell site 133 provides four sectors, a first cell sector 141 substantially defined by the main lobe of the first directional antenna array, a second sector substantially defined by the main lobe of the second directional antenna array, and so on.

It is to be understood that the preceding example uses four sectors for illustrative purposes only, and a greater or lesser number of sectors may actually be employed to meet the needs of specific system applications. One reason for providing sectorized cells is to improve the strength and reliability of cellular signals throughout the desired coverage area of the cell site. Another reason for using cell sectors is to maximize the capacity and utilization of a given cell, especially if that cell must serve a high-traffic area. Finally, sectorized cells may be advantageously employed in situations where the cell site is not situated near the center of the desired service area. Higher-gain antennas may be aimed towards the desired service area, with lower-gain antennas aimed in other directions to minimize interference to other cell sites.

A second mobile telephone switching office (second MTSO) 127 is at the third cell site 119, and this second MTSO 127 is coupled to fourth cell site 133 via a communications link 129, and also to fifth cell site 143 via communications link 145. However, second MTSO 127 could, alternatively, be located at fourth cell site 133, or situated at a location physically removed from third cell site 119, fourth cell site 133, and fifth cell site 143.

In circumstances where the second MTSO 127 is remotely situated with respect to a particular cell site, that cell site may be linked to the second MTSO via a communications pathway such as communications link 129 and/or communications link 145. Communications link 129 and/or communications link 145 may each represent a wireless communications link or the like, a wired communications link or the like, a fiber-optic link, or any combination of the aforementioned types of links. A region termed the "coverage area of second MTSO 117" includes the combined coverage areas of third cell site 119, fourth cell site 133, and fifth cell site 143. If other cell sites in addition to third cell site 119 fourth cell site 133, and fifth cell site 143 are coupled to second MTSO 127, the coverage areas of these other cell sites may also be incorporated into the coverage area of second MTSO 117. Second MTSO 127 is shown as including three cell sites for illustrative purposes only, it being understood that the second MTSO may include any convenient number of cell sites. Third cell site 119, fourth cell site 133, and fifth cell site 143 may each be equipped to provide coverage substantially throughout a conventionally-sized cell that typically covers a radius of about 0.5 to 10 miles. However, one or more of the third cell site 119, the fourth cell site 133, and the fifth cell site 143 may represent a microcell or a picocell having a coverage area effectively limited, for example, to an office building or a shopping mall.

First MTSO 107 is coupled to second MTSO 127 via communications link 114, which represents a wireless communications link, a wired link, a fiber-optic link, any combination of the aforementioned links, or the like. First MTSO 107 is coupled to a first MTSO processor 111. Second MTSO 127 is coupled to a second MTSO processor 125. First MTSO processor 111 is coupled to a first MTSO memory register 109 and also to a first MTSO database 113. Second MTSO processor 125 is coupled to a second MTSO memory register 121 and also to a second MTSO database 123. First MTSO processor 111 may be implemented using a microprocessor, a micro-controller, and/or a computer mainframe processing device, and second MTSO processor 125 may be implemented using any of the aforementioned devices mentioned in connection with the first MTSO processor 111.

First MTSO database 113 is a data storage drive such as, for example, a computer hard drive, a magnetic tape storage device, electronic random-access memory (RAM), or electronic read-only memory (ROM), and second MTSO database 123 may also be implemented using any of these devices. Second MTSO memory register 121, and first MTSO memory register 109, are each used for temporarily storing records, and may be implemented using electronic random-access memory devices, microprocessor memory registers, and/or flip-flops.

In the example of FIG. 1, it is possible that a cellular telephone subscriber has established a cellular telephone service account for cellular telephone transceiver 115 via first MTSO 107. In this case, a service profile corresponding to cellular telephone transceiver 115 is stored in the first MTSO database 113. The structure and organization of an illustrative service profile is shown in FIG. 2. First MTSO database 113 is equipped to store a plurality of service profiles, wherein each service profile corresponds to a given cellular telephone device, and/or to a given cellular telephone subscriber. Although, in the present example, service profiles are described as being stored in an MTSO database, this is for purposes of illustration only, it being understood that service profiles may be stored in any intelligent network node.

Referring now to FIG. 2, the data structure of service profile 201 is shown. The service profile 201 includes a MIN field 203, an ESN field 205, a services field 207, a credit field 209, a PIC field 211, and a call forwarding field 213. A mobile identification number is stored in MIN field 203, and this identification number may, but need not, represent the telephone number of the cellular telephone device corresponding to service profile 201. ESN field 205 includes the electronic serial number of this cellular telephone device.

Services field 207 specifies whether or not a plurality of telephone call treatment features are to be performed. In the present example, a first sub-field specifies whether or not a call-forwarding feature is enabled, a second sub-field indicates whether or not a conference-calling feature is enabled, a third sub-field specifies whether or not a call-waiting feature is enabled, and a fourth sub-field specifies whether or not a three-way calling feature is enabled.

Credit field 209 indicates whether or the telephone subscriber using the telephone device corresponding to service profile 201 has good financial credit. Typically, credit field 209 is used to flag telephone subscribers who have delinquent or past-due accounts so that additional cellular telephone charges will not accrue.

PIC field 211 specifies a primary inter-exchange carrier that will be used to complete inter-exchange (i.e., long-distance) telephone calls placed by the telephone subscriber on the cellular telephone device corresponding to service profile. Of course, the telephone subscriber can override the long-distance carrier set forth in the PIC field 211 by specifying the particular inter-exchange carrier that will be used to carry a given telephone call. Nevertheless, the carrier specified in the PIC field 211 is a "default" carrier to be used if the subscriber does not specify any carrier for a given outgoing call. Call forwarding field 213 includes one or more call forwarding numbers to which calls are to be forwarded if this feature has been enabled (refer to the description of the call forwarding sub-field in services field 207).

A user zone field 215 specifies one or more user zone identifiers that identify one or more user zones to which the cellular telephone subscribes. In the present example, the cellular telephone subscribes to a first user zone and a fourth user zone. The user zone identifiers may optionally include a user zone MTSO identifier field specifying the identity of an MTSO coupled to at least a portion of the user zone. However, it is possible to select user zone identifiers that also identify a given MTSO by implication. For example, if the user zone identifier is a ten-digit decimal number, the first four digits could be used to specify a given MTSO and the last six digits could be used to specify a given user zone having at least a portion thereof situated within the coverage area of that MTSO. Alternatively, the user zones specified in the user zone field 215 could be limited to user zones having at least a portion thereof in the coverage area of the MTSO specified in MTSO field 217, to be described below.

MTSO field 217 stores an MTSO identifier corresponding to the MTSO in which the service profile 201 is stored. The MTSO in which a given service profile 201 is stored may be termed a home MTSO with respect to that service profile. Assuming that first MTSO 107 is the home MTSO for service profile 201, then this service profile is stored in the first MTSO database 113 of first MTSO 107. In general, this service profile 201 is not stored in any other MTSO database such as the second MTSO database 123 of second MTSO 127.

An optional user zone priority table 219 is stored in service profile 201. This user zone priority table ranks a plurality of user zones by priority. In this manner, if the cellular telephone is located in, and authorized for use in, more than one user zone, the MTSO processor for the cell site in which the telephone is currently situated can use this priority table to select the appropriate user zone. For example, the user zone priority table of FIG. 2 specifies that the fourth user zone has first priority and that the first user zone has second priority. Of course, this priority ranking applies if at least a portion of the first and fourth user zones overlap.

Service profile 201 may, but need not, include a billing rate specification setting forth a billing rate to be applied to the cellular telephone, and this optional billing rate specification may associate each of a plurality of user zones with a corresponding billing rate to be applied when the cellular telephone is in that user zone. If, however, the service profile does not include a billing rate specification, then the MTSO processor of the MTSO serving a given user zone is programmed to implement the appropriate billing rate for that user zone.

MTSOs in which the user service profile 201 is not stored are remote MTSOs with respect to that particular service profile. Therefore, a determination as to whether a given MTSO is a "home MTSO" or a "remote MTSO" is not performed in the abstract but, rather, must be implemented in relation to a given service profile 201. Assume that service profile 201 is for cellular telephone transceiver 115. In the example of FIG. 1, first MTSO 107 is the home MTSO and second MTSO 127 is the remote MTSO, with reference to cellular telephone transceiver 115. However, with respect to another cellular telephone transceiver that has its service profile stored in second MTSO database 123, then second MTSO 127 is actually the home MTSO for this transceiver, and first MTSO 107 is the remote MTSO for this transceiver.

Since the service profile 201 of cellular telephone transceiver 115 is not stored in the second MTSO database 123, a potential problem arises if cellular telephone transceiver 115 leaves the coverage area of first MTSO 105 and enters the coverage area of second MTSO 117. In such a case, the second MTSO 127 could search the entire second MTSO database 123 for the service profile 201 of cellular telephone transceiver 115, but no such service profile would be found. However, the cellular telephone transceiver 115 transmits an identification signal that uniquely identifies the first MTSO 107 to the second MTSO 127. In response to this identification signal, the second MTSO 127 establishes a communications pathway, over communications link 113, to the first MTSO 107 identified by the cellular telephone transceiver 115.

Existing cellular infrastructure provides a subscriber located in the coverage area of a second MTSO 117 with substantially the same set of features as would be available to that subscriber in the coverage area of the first MTSO 105. In some special cases, however, the set of features offered by the second MTSO 127 may not be identical to the set of features offered by the first MTSO 107. When the subscriber's service profile specifies a feature that the first MTSO 107 can perform, but that the second MTSO 127 is not equipped to handle, such a feature will only be performed in the coverage area of the first MTSO 105, and not in the coverage area of the second MTSO 117. The aforementioned scenario, however, is exceptional and, in general, most subscriber features are available within the coverage area of the first MTSO 105, as well as within the coverage area of the second MTSO 117. Such cellular service is "transparent" to the subscriber, inasmuch as the subscriber need not be concerned with the mechanistic details of cellular calls, such as the identity of the MTSO handling a given call.

The present-day cellular network provides substantially location-transparent service as follows. The second MTSO 127 interrogates the first MTSO 107 over communications link 113, requesting that the first MTSO 107 send the second MTSO 127 a copy of the service profile 201 corresponding to cellular telephone transceiver 115. The first MTSO 107 then searches the first MTSO database 113, locates the service profile 201, and sends a copy of the service profile to the second MTSO 127. In this manner, the second MTSO 117 is instructed to provide the same set of features to the cellular subscriber as would be provided in the coverage area of the first MTSO 105. Although this approach provides substantially uniform cellular service throughout a cellular telephone network, no mechanism exists for providing location-dependent cellular service features.

Many presently-existing cell sites are equipped to provide coverage over a radius of about 0.5 to 10 miles. However, it is often difficult to provide acceptable coverage throughout such cells, due to FCC regulations limiting transmitter power, the unavailability of suitable antenna locations, rough terrain, buildings, and various other factors. Coverage is especially poor in densely-populated downtown business districts and in interior (windowless) rooms of office buildings. Moreover, the characteristics of locations within the cell are generally quite diverse. For example, cells may cover several residential subdivisions, an industrial park, a large university campus, and a central business district. Since the characteristics of the subscriber's location are not well-correlated with cell boundaries (or MTSO coverage area boundaries), the need for providing location-dependent features has not been appreciated.

The current trend is to create a larger number of smaller-sized cells. Each of these "downsized" cells, sometimes termed "picocells" or "microcells" are designed to cover a relatively small, well-defined area such as a given office building, corporate campus, or suburban shopping mall. One consequence of using picocells and/or microcells is that the characteristics of locations within these smaller cells are much more uniform than would be the case with larger cells, and the characteristics of the subscriber's location tend to correlate well with microcell and/or picocell boundaries. For example, the coverage area of a picocell may be limited to an industrial park, in which case it would be desirable to provide subscriber features tailored to the specific characteristics of this location.

FIG. 3 is a data structure diagram setting forth the structure of a user zone profile 301. This user zone profile 301 is stored in an MTSO database of an MTSO that provides coverage over at least a portion of the user zone characterized in user zone profile 301. A given MTSO can, therefore, store zero, one, or a plurality of user zone profiles 301, depending upon the number of user zones having at least a portion thereof included in that MTSO.

The user zone profile 301 includes a user zone identifier uniquely identifying a given user zone to be described by that profile. In the example of FIG. 3, this user zone identifier specifies the third user zone. Since a user zone is defined in terms of cell, picocell, microcell, cell sector, picocell sector, and/or microcell sector boundaries, the user zone profile 301 contains one or more zone specifiers 303.

Each zone specifier 303 identifies a specific cell, microcell, picocell, cell sector, microcell sector, or picocell sector that is a part of the user zone to be defined in the user zone profile 301. Taken together, the zone specifiers 303 of a given user profile 301 describe the entire coverage area of a given user zone. For example, a first zone specifier sets forth the entire second cell, a second zone specifier sets forth the southeast sector of the fourth cell from 90 degrees true North to 180 degrees, a third zone specifier sets forth the Northeast sector of the third cell site from 0 degrees to 90 degrees, and a fourth zone specifier sets forth the Southeast sector of the third cell site from 90 degrees to 180 degrees. Optionally, any or all of the zone specifiers may also contain MTSO identifiers specifying the MTSO in which the cell, microcell, picocell, cell sector, microcell sector, or picocell sector is located.

The third user zone, as defined by user zone profile 301, includes the entire coverage area of the second cell, the Southeast sector of the fourth cell site, and the Eastern sector of the third cell site.

An optional service profile modifications data structure 305 can be incorporated into the user zone profile stored at the MTSO. The purpose of the service profile modifications data structure 305 is to instruct the MTSO processor as to the manner in which the service profile of a given subscriber, a given set of subscribers, and/or all subscribers, are to be modified. The service profile modifications data structure 305 includes a service profile modifications field 307 that specifies the field or fields in the service profile (FIG. 2, 201) that are to be modified. For each of the fields to be modified, the manner in which the field is to be modified is specified in a modification field 311. For example, if the service profile is to be modified to disable call forwarding, the service profile modifications field 307 specifies the call forwarding field of the service profile, and associates the call forwarding field with a "disable" modification in modification field 311 indicating that the call forwarding field is to be disabled if it is not already disabled.

If desired, the service profile modification fields may be customized for a plurality of cellular subscribers, such that a respective service profile modifications field 307 is associated with a corresponding service profile identifier 309 of a given cellular subscriber, and/or with corresponding service profile identifiers 309 of a plurality of cellular subscribers. These service profile modification fields 307, including one or more additional service profile identifier fields 309 setting forth a given service profile (or given service profiles) for which the modification is to be performed, are stored at the MTSO. However, it is also possible for the MTSO to use the same service profile data structure 305 to modify service profiles for all authorized subscribers in a given user zone.

Figure 4A:
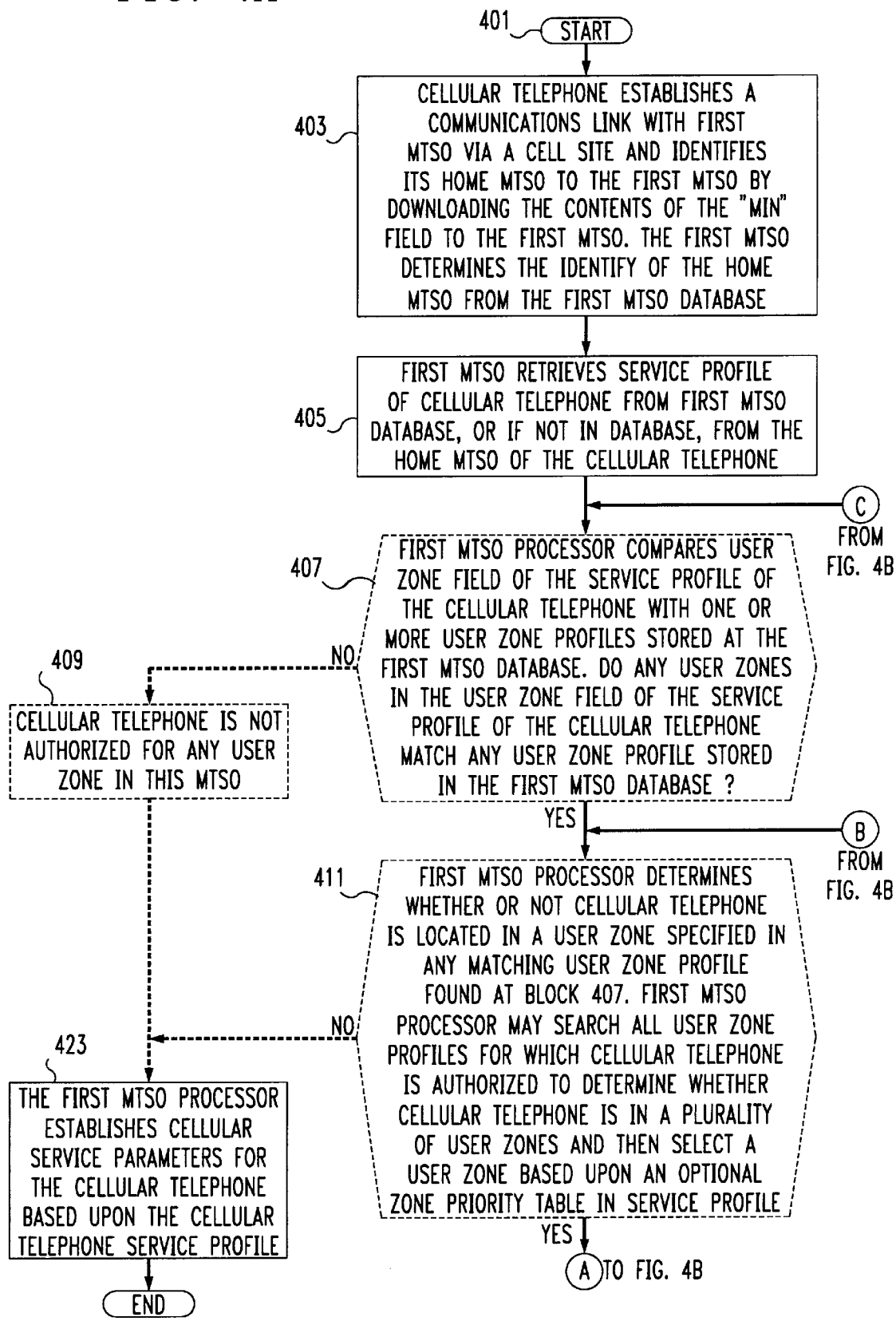
FIGS. 4A and 4B comprise a software flowchart setting forth an operational sequence to be performed by the system of FIG. 1 according to various embodiments disclosed herein.
Figure 4B:
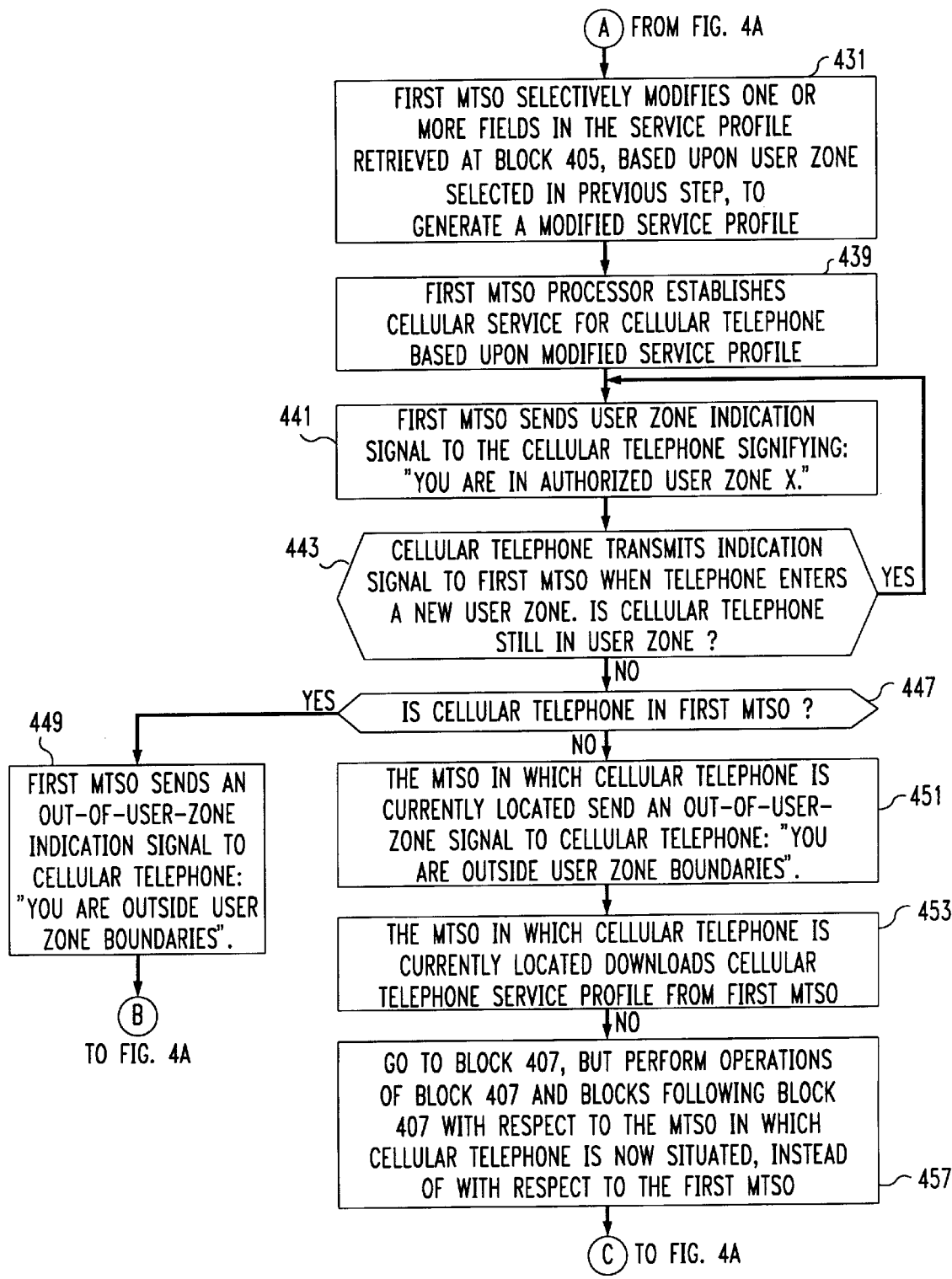

FIGS. 4A and 4B comprise a software flowchart setting forth an operational sequence to be performed by the system of FIG. 1 according to various embodiments disclosed herein. In the flowchart of FIGS. 4A and 4B, it is assumed that a first set of locations is defined by the coverage area of the first user zone 139. A user zone profile for the first user zone is stored in the first MTSO database 113. A second set of locations is defined as being anywhere outside the first user zone 139.

FIGS. 4A and 4B set forth a method for providing a first set of cellular features in a first set of locations and a second set of cellular features in a second set of locations. According to the embodiment described in FIGS. 4A and 4B, this functionality is performed by modifying the service profile 201 of a given cellular telephone when that telephone is situated within the first user zone 139, and to not modify the service profile otherwise. However, note that it is alternatively possible to modify the service profile 201 only when the cellular telephone is situated outside the user zone.

User zone 139 is discussed in conjunction with FIGS. 4A and 4B for illustrative purposes only, it being understood that a user zone can include virtually any area conforming to the definition of user zone discussed above. The procedure of FIGS. 4A and 4B is applicable to any user zone conforming to this definition, and not just to user zone 139. Therefore, the procedure of FIGS. 4A and 4B is equipped to modify service profile 201 once the cellular telephone subscriber leaves a first cell, picocell, or microcell within a given MTSO and enters a second cell, picocell, or microcell within the same MTSO. This procedure is also equipped to modify the service profile once the cellular telephone subscriber leaves a first sector of a given cell, microcell, or picocell and enters a second sector of the same cell, microcell, or picocell, or a sector of another cell, microcell, or picocell. Some user zones require that the service profile be modified once the subscriber leaves a first group of cell sectors and enters a second group of cell sectors, wherein the group of cell sectors may, but need not, be selected from the same cell, microcell, or picocell. The procedure of FIGS. 4A and 4B also addresses this lastmentioned type of user zone.

In the case where a cellular subscriber is assigned a service profile by a home MTSO, and the subscriber accesses a user zone requiring a different set of features than that specified in the service profile, the service profile may be modified at the home MTSO or, alternatively, at a remote MTSO if a remote MTSO is currently being accessed by that subscriber. Assume, for example, that a user zone is defined as including a second cell site but not a first cell site. The first and second cell sites can, but need not, be in the same MTSO. In such a case, the home MTSO may send an unmodified service profile to the first cell site and may modify the service profile sent to the second cell site. Alternatively, the home MTSO may send the same service profile to both the first and second cell sites, whereupon the first cell site does not modify the service profile but the second cell site does modify the profile. If service profile modifications are performed at cell sites, then the cell site should be equipped with a processing device, such as a microprocessor, personal computer, mainframe computer, or the like. In the example of FIGS. 4A and 4B, the service profile is modified at the MTSO having a coverage area that encompasses at least a portion of the user zone.

The operational sequence of FIGS. 4A and 4B commences at block 401 (FIG. 4A, the "start" block) and, at block 403, a cellular telephone establishes a communications link with the first MTSO 107 (FIG. 1) via a cell site (i.e., second cell site 103). At approximately the time that the cellular telephone establishes a communications link with the first MTSO, the cellular telephone also identifies its home MTSO to first MTSO 107 by downloading the contents of the MIN field 203 (FIG. 2) to the first MTSO 107 (FIG. 1). The first MTSO determines the identity of the home MTSO from the first MTSO database 113 (FIG. 1). The first MTSO retrieves the service profile 201 (FIG. 2) of this cellular telephone from the first MTSO database 113 (FIG. 1) if the first MTSO is the home MTSO specified by the cellular telephone. However, if the first MTSO 107 is not the home MTSO for that cellular telephone, the first MTSO database 113 will not include a service profile for the cellular telephone. In the latter case, the first MTSO 107 obtains this service profile from the home MTSO of the cellular telephone.

Program control then progresses to optional block 407 (FIG. 4), where the first MTSO compares the user zone field downloaded from the home MTSO of the cellular telephone with one or more of the user zone profiles stored at the first MTSO database 113 (FIG. 1). A test is performed to ascertain whether or not any of the user zones in the user zone field 215 (FIG. 2) of the service profile 201 of the cellular telephone match any of the user zone profiles 301 (FIG.3) stored in the first MTSO database 113 (FIG. 1). If optional block 407 is not to be performed, then program control progresses directly from block 405 to block 411. Optional block 407 is not performed in the event that it is desired to authorize a given user zone for use by all subscribers, irrespective of the home profiles of these subscribers.

The negative branch from optional block 407 (FIG. 4) leads to optional block 409, and the affirmative branch from block 407 leads to block 411. By way of explanation, if optional block 407 is employed, then optional block 409 must also be employed, whereas if optional block 407 is not employed, then optional block 409 must not be employed. Traversing the negative branch of the flowchart from block 407 to block 409, it is determined that the cellular telephone is not authorized for any user zone in the first MTSO. The program advances to block 423, at which time the first MTSO processor 111 (FIG. 1) establishes cellular service parameters for the cellular telephone based upon the cellular telephone service profile retrieved at block 405, and the program exits.

The affirmative branch from block 407 leads to block 411, where the first MTSO processor determines whether or not the cellular telephone is in a user zone specified in any of the matching user zone profiles, i.e., whether the cellular telephone is located in a user zone (and, if blocks 407 and 409 were performed, whether this is a user zone for which the cellular telephone is authorized). According to one embodiment, the MTSO processor searches all user zone profiles (if applicable, all profiles for which a cellular telephone is authorized) to determine all user zones in which the cellular telephone is situated. As discussed above in connection with FIG. 2, the service profile 201 (FIG. 2) is equipped with an optional user zone priority table 219 associating a plurality of user zones with corresponding priority designations specifying the relative priority of that user zone relative to other user zones. The processor is programmed to search through all user zone profiles for which the cellular telephone is authorized and, if the cellular telephone is in more than one user zone, only the user zone having the highest relative priority is subsequently processed at block 431. In an alternate embodiment, a user zone priority table is not required. As soon as the first MTSO processor locates any user zone in which the cellular telephone is currently situated, the service profile corresponding to that user zone is activated for that cellular telephone.

If the MTSO processor determines that the cellular telephone is not in any of the user zones described by any of the matching user zone profiles, the program advances to block 423, where the first MTSO processor establishes cellular service parameters for the cellular telephone based upon the cellular telephone service profile retrieved at block 405.

If the MTSO processor determines that the cellular telephone is in a user zone at block 411, the program advances to block 431 where the first MTSO selectively modifies one or more of the fields in the service profile retrieved at block 405 to generate a modified service profile. The processor may, but need not, be programmed to modify portions of the service profile based upon the specific identity of the user zone that was selected by the first MTSO processor at block 411 (FIG. 4). Similarly, the processor may, but need not, be programmed to modify portions of the service profile based upon the contents of one or more fields in the service profile.

In cases where the MTSO processor is programmed to modify portions of the service profile based upon the identity of the user zone, the first MTSO processor utilizes the user zone profile stored at the MTSO. The user zone profile is used to determine the particular field or fields in the service profile that are to be modified, and/or the specific modifications to be performed on one or more given fields of the service profile. The processor may be programmed to automatically modify service profiles based upon this user zone profile.

An optional service profile modifications field can be incorporated into the user zone profile stored at the MTSO. The purpose of the service profile modifications field is to instruct the MTSO processor as to the manner in which the service profile of a given subscriber, a given set of subscribers, and/or all subscribers, are to be modified. This service profile modifications field specifies the field or fields in the service profile that are to be modified. For each of the fields to be modified, the manner in which the field is to be modified is specified. For example, if the service profile is to be modified to disable call forwarding, the service profile modifications field specifies the call forwarding field of the service profile, and associates the call forwarding field with a "disable" modification indicating that the call forwarding field is to be disabled if it is not already disabled.

If desired, the service profile modification fields may be customized for a plurality of cellular subscribers, such that a respective service profile modifications field is associated with a corresponding service profile of a given cellular subscriber, and/or with corresponding service profiles of a plurality of cellular subscribers. These service profile modification fields, including one or more additional fields setting forth a given service profile (or given service profiles) for which the modification is to be performed, are stored at the MTSO. However, it is also possible for the MTSO to use the same service profile modification field to modify service profiles for all authorized subscribers in a given user zone.

If the first MTSO 107 is conceptualized as a switching node, this node provides a first set of features to the cellular telephone from a first set of locations, and a second set of features to the cellular telephone from a second set of locations. The first set of locations includes locations within the user zone, and the second set of locations includes locations outside of the user zone.

By way of an example, at block 431 (FIG. 4B), the first MTSO processor may change the PIC field 211 (FIG. 2) of the service profile to specify long-distance service from company X instead of company Y, but only if the subscriber's cellular telephone is in a first user zone defined by all cells that cover the state of Texas. If the cellular telephone is not in the first user zone, then the first MTSO processor does not modify the PIC field 211 in the service profile, and company Y is retained as the preferred inter-exchange carrier. However, if the cellular telephone is in a second user zone defined by all cells that cover the county of New Castle, Del., then the first MTSO processor changes the PIC field 211 to specify long-distance service from company Z instead of company Y.

To present another example, the first MTSO processor is programmed to modify the services field 207 (FIG. 2) only if the subscriber has accessed a picocell covering the Sears Tower in downtown Chicago. If the subscriber has accessed this picocell, the call forwarding sub-field of the services field will be modified to enable call forwarding. However, if the call forwarding sub-field already indicates that call forwarding is enabled, no modification of this sub-field is required. If the MTSO determines that the subscriber has not accessed the picocell covering the Sears Tower in downtown Chicago, the call forwarding sub-field is not modified.

As a further example, the first MTSO processor is programmed to modify the services field (FIG. 2) with a first modification if the first MTSO determines that the subscriber has accessed a picocell covering the Sears Tower (this picocell access was previously determined at FIG. 4A, block 411). The first MTSO processor is also programmed to modify the services field with a second modification if the first MTSO determines that the subscriber has accessed a picocell covering the Hancock Building in downtown Chicago, and to not modify the services field otherwise. For purposes of the present example, the Hancock Building and the Sears Tower may, but need not, be served by the first MTSO. The first modification enables the call forwarding sub-field if the sub-field is not already enabled, and specifies that call forwarding is to forward incoming calls to the first telephone number in call forwarding field 213, i.e., telephone number 908-555-4297. The second modification enables the call forwarding sub-field if the sub-field is not already enabled, and specifies that call forwarding is to forward calls to the second number in call forwarding field 213, i.e., 919-555-5924.

Program control progresses to block 439, where the first MTSO processor establishes cellular service for the cellular telephone based upon the modified service profile. Next, at block 441, the first MTSO sends a user zone indication signal to the cellular telephone signifying that the cellular telephone subscriber is situated in user zone X. At block 443, the first MTSO processor periodically performs a test to ascertain whether or not the cellular telephone is still located within the user zone. This function may be performed, for example, by monitoring cell hand-off requests received at the MTSO from the cellular telephone, and/or by monitoring for changes in the active directional antenna array at the cell site in the case of a sectorized cell. Note that, when a cellular telephone moves from one cell sector to another cell sector, a different directional antenna array is activated at the cell site.

If the cellular telephone remains in the user zone, the program loops back to block 441. However, if the cellular telephone leaves the user zone, a test is performed at block 447 to ascertain whether or not the cellular telephone is still in the first MTSO. If so, the first MTSO sends an out-of-user-zone indication signal to the cellular telephone (block 449), signifying that "you are outside the user zone boundaries". The program then loops back to block 411 to determine whether or not the cellular telephone is in another user zone.

If the cellular telephone is not still in the first MTSO as determined at block 447, the program advances to block 451 where the MTSO in which the cellular telephone is currently situated sends an out-of-user-zone signal to the cellular telephone signifying that "you are outside the user zone boundaries". At block 453, the MTSO in which the cellular telephone is currently located downloads the cellular telephone service profile from the first MTSO.

At block 457, the program loops back to block 407, but the operations of block 407 and the blocks following block 407 are now performed with respect to the MTSO in which the cellular telephone is now situated, instead of with respect to the first MTSO. To be specific, when looping back to block 407 from block 457, all subsequent references to the "first MTSO" are replaced with references to "the MTSO in which the cellular telephone is currently located." Similarly, replace all subsequent references to the "first MTSO processor" with "the processor of the MTSO in which the cellular telephone is currently located", and replace all subsequent references to the "first MTSO database" with references to "the database of the MTSO in which the cellular telephone is currently located".

As stated above, a user zone is defined as one or more sectors of a cell, microcell, or picocell, as a group of cells, microcells or picocells, or as a combination of sectors and groups. Within the user zone, a cellular subscriber is provided with a first set of features, and outside the user zone, the subscriber is provided with a second set of features, wherein the first set of features is not identical to the second set of features. Although the examples above referred to features such as the selection of a given preferred interexchange carrier, other features may include subscriber billing parameters. For example, in a specific user zone, a subscriber may be billed at a different rate than if that same subscriber were to be situated outside this user zone.

The first and second sets of features referred to above may be defined such that a given subscriber is provided with cellular service only if the subscriber is situated within a specific user zone. If the subscriber is not in that user zone, the subscriber receives no cellular service. This embodiment is useful, for example, in situations where a corporation desires to provide limited cellular service to personnel or customers who are situated on the corporate campus, while preventing such customers from accessing this cellular service beyond the confines of the campus.

Although the embodiments described in connection with FIGS. 4A–4B modify a service profile if a given cellular telephone is authorized for a given user zone and actually located in that user zone, this approach was discussed for illustrative purposes. In an alternate approach, the service profile is modified whenever the cellular telephone is outside the user zone, and the service profile is also modified within the user zone, unless the cellular telephone is authorized for that user zone, in which case the profile is not modified.

Pursuant to another approach, the MTSO modifies the service profile for all cellular telephones in a given user zone, regardless of whether or not the cellular telephone is authorized for that user zone. In a variation of this embodiment, an interactive voice response system and/or message delivery system is coupled to the MTSO. When a cellular telephone establishes communications with the MTSO from within a user zone, the MTSO does not modify the service profile of the cellular telephone, but instead instructs the interactive messaging system and/or message delivery system to provide the cellular telephone with a message. The message is delivered automatically, and/or the interactive messaging system provides the subscriber with the option of accessing the message or not accessing the message. In this manner, a message specifically tailored to the characteristics of a given user zone, such as a traffic report, a weather-related warning, or an advertisement for local a establishment, may be delivered to cellular subscribers.

Since the embodiments disclosed herein provide location-dependent cellular service feature selection, cellular subscribers may wish to be provided with some indication as to their current location. A subscriber may wish to know whether or not he is, in fact, accessing a given user zone. Moreover, a mobile subscriber may wish to know whether or not a user zone boundary has been crossed while a call is in progress. Therefore, cell sites (i.e., first cell site 101, second sell site 103, etc., FIG. 1) and/or MTSOs (i.e, first MTSO 107, second MTSO 127, FIG. 1) may be equipped to transmit an indication signal to the subscriber's cellular telephone only if the cellular telephone is accessing a given user zone.

The indication signal may take the form of an in-band, inaudible sub-carrier pilot tone or data signal that is detected by the cellular telephone receiver circuitry and used to illuminate a lamp, an LED (light-emitting diode) device, or some other type of indication device. In this manner, a specific location identifier or location indicator appears on a display device associated with the subscriber's cellular telephone while the telephone is situated within the user zone.

In the case where a data signal is employed for the indication signal, the data signal may include representations of alphanumeric characters. This data signal id processed by receiving circuitry on specially-equipped cellular telephones and used to activate an alphanumeric display on the telephone.

Various methods of transmitting alphanumeric data signals are well-known to those skilled in the art. Some of these methods are useful in the environment of analog cellular systems, some of these methods operate in conjunction with digital CDMA (coded domain multiple access) or TDMA (time division multiple access) cellular systems, and still others of these methods operate in conjunction with digital as well as analog cellular systems.

One example of alphanumeric data transmission is a service known to those skilled in the art as the "small messaging service" Another example is the RDS (radio data service) standard that was adopted by the Federal Communications Commission for use in conjunction with domestic FM broadcasting stations. Note that the concepts set forth in the RDS standard, as well as other alphanumeric data transmission standards, are applicable to virtually any communications system, including cellular. For example, the RDS standard can be adapted for cellular use by changing the sub-carrier frequency of the data signal to meet the narrower signal bandwidths used in the cellular service relative to the bandwidths used by FM broadcast stations.

Alphanumeric data transmission standards provide for the inaudible transmission of a data signal along with an audio signal. For example, pursuant to the RDS standard, an inaudible sub-carrier is transmitted along with an FM broadcast to provide alphanumeric data information along with conventional broadcasts. In the United States, the RDS signal typically specifies the call letters and/or slogan of a broadcast station, such as "Q-107", and these characters appear on specially-equipped RDS receivers with alphanumeric display units.

In the context of the system of FIG. 1, cell sites may optionally be equipped to transmit an alphanumeric data signal along with the voice signal The alphanumeric data includes characters that identify the user zone, if any, in which the cellular telephone is currently situated. In this manner, when the cellular subscriber is situated within a first user zone, the cell site (i.e, first cell site 101, FIG. 1) transmits an alphanumeric data signal spelling out words identifying the first user zone, and/or a description of one or more features offered in the zone.

For example, if a first user zone is defined as including cell site boundaries and cell sector boundaries that roughly conform to the corporate boundaries of the city of Princeton, N.J., then the alphanumeric characters sent by the cell site may spell out the words "PRINCETON, N.J." on the subscriber's cellular telephone. If the subscriber has specified access to long-distance service from carrier Z while in this user zone, then the alphanumeric characters may spell out the words "Carrier Z" on the subscriber's cellular telephone. The subscriber telephones can optionally be programmed to display a set of default alphanumeric characters in the absence of receiving a data signal from a cell site.

A cellular subscriber may wish to be notified when crossing the boundary of a user zone. Therefore, when a call is in progress and the subscriber crosses the boundary of a user zone by entering a user zone, leaving a user zone, or crossing from one user zone to another user zone, the MTSO serving the user zone (i.e., second MTSO 127 or first MTSO 107, FIG. 1) causes an in-band, audible tone to be transmitted to the subscriber's cellular telephone, notifying the subscriber that a user zone boundary has been traversed. The MTSO also generates a new billing record as a user zone boundary is crossed, to reflect any desired change in the subscriber billing rate.

The invention claimed is:

1. In a wireless communications system including cells, microcells, picocells, cell sectors, microcell sectors, and picocell sectors, and a user zone applicable to wireless communications for a given subscriber, said user zone including one or more cells, microcells, picocells, cell sectors, microcell sectors, and/or picocell sectors, a method of providing location-dependent calling service features to a cellular telephone comprising the steps of:

(a) enabling a first set of features for a cellular telephone when the cellular telephone is situated in the user zone; and (b) enabling a second set of features for a cellular telephone when the cellular telephone is situated outside the user zone, wherein the first set of features is not identical to the second set of features.

2. The method of claim 1 further including the step of the wireless communication system storing a service profile for the cellular telephone, the service profile including (i) an identification number identifying the cellular telephone, (ii) a calling service feature specification indicative of whether or not each of one or more cellular telephone calling service features are to be performed, and/or specifying one or more operating parameters for cellular service; the calling service feature specification further including a user zone specification identifying one or more user zones for which the cellular telephone is authorized.

3. The method of claim 2 further including the step of modifying a calling service feature of the service profile when the cellular telephone is in the user zone, and not modifying a calling service feature of the service profile when the cellular telephone is not in the user zone.

4. The method of claim 1 wherein a first user zone and a second user zone have an overlapping area where the cellular telephone is situated, said method further comprising the step of enabling the set of calling service features for the cellular telephone applicable to the user zone that has priority over the other user zone in the overlapping area in accordance with a predetermined user zone priority ordering.

5. The method of claim 1 further comprising the step of enabling the subscriber to select first and second sets of calling service features.

6. The method of claim 2 further including the following steps:

(a) storing the service profile at a home MTSO;

(b) coupling the user zone to a user zone MTSO;

(c) receiving a signal at a user zone MTSO from a cellular telephone specifying the identity of the cellular telephone and the identity of the home MTSO;

(d) the user zone MTSO retrieving the service profile from the home MTSO;

(e) the user zone MTSO determining whether or not the cellular telephone is located within any user zone; and (f) if the cellular telephone is located in a user zone, the user zone MTSO selectively modifying at least a portion of the calling service feature specification of the service profile.

7. The method of claim 6 wherein the user zone MTSO is the home MTSO.

8. The method of claim 6 wherein the user zone MTSO is not the home MTSO.

9. The method of claim 6 wherein the calling service feature specification designates a first primary inter-exchange carrier for long-distance telephone service, step (g) further comprising the step of modifying the calling service feature specification to specify a second preferred primary inter-exchange carrier, such that a cellular subscriber accesses the first primary inter-exchange carrier from outside the user zone and accesses the second primary inter-exchange carrier from within the user zone.

10. The method of claim 6 wherein the calling service feature specification specifies a first call forwarding telephone number to which incoming calls are forwarded, step (g) further comprising the step of modifying the calling service feature specification to specify a second call forwarding telephone number to which incoming calls are forwarded.

11. The method of claim 6 wherein the calling service feature specification disables a conference calling feature for providing a communications link among more than two telephonic devices, step (g) further comprising the step of modifying the calling service feature specification to enable the conference calling feature.

12. The method of claim 6 wherein the calling service feature specification enables a call waiting parameter such that, if a cellular telephone call is in progress, the subscriber is notified of the existence of an incoming telephone call, step (g) further comprising the step of modifying the calling service feature specification to disable the call waiting feature.

13. The method of claim 6 wherein the calling service feature specification disables a call waiting parameter such that, if a cellular telephone call is in progress, the subscriber is notified of the existence of an incoming telephone call, step (g) further comprising the step of modifying the calling service feature specification to enable the call waiting feature.

14. The method of claim 6 further comprising the steps of:

(a) billing a wireless communications services subscriber situated in the user zone at a first rate, and (b) billing the wireless communications services subscriber situated outside of the user zone at a second rate.

15. The method of claim 6 wherein a given cellular telephone is provided with communication service only if the cellular telephone is situated within the user zone.

16. The method of claim 6 wherein a given cellular telephone is provided with communication service only if the cellular telephone is situated outside the user zone.

17. The method of claim 6 further including the step of the cellular telephone displaying a humanly discernible indication as to whether or not the cellular telephone is accessing a given user zone.

18. The method of claim 5 adapted for use in conjunction with an MTSO equipped with a message delivery system, the method further including the step of the MTSO delivering a message to a cellular telephone indicating which the user zone the cellular telephone is accessing.

19. The method of claim 18 wherein the message delivery system is an interactive voice response system and the method further includes the step of the MTSO delivering a prompt from the interactive voice response system to the cellular telephone, the MTSO delivering the message to the cellular telephone only upon receiving a response to the prompt.

20. The method of claim 19 wherein the message delivery system is an interactive voice response system and the method further includes the step of the MTSO delivering a prompt from the interactive voice response system to the cellular telephone, the MTSO delivering the message to the cellular telephone only upon not receiving a response to the prompt within a specified period of time.

21. The method of claim 18 wherein the message names the user zone being accessed.

22. The method of claim 18 wherein the message names the PIC used in the user zone being accessed.

23. In a wireless communications system including cells, microcells, picocells, cell sectors, microcell sectors, and picocell sectors, and a user zone applicable to wireless communications for a given subscriber, said user zone including one or more cells, microcells, picocells, cell sectors, microcell sectors, and/or picocell sectors a method of providing location-dependent communication services to a cellular telephone comprising the steps of:

(a) enabling a cellular telephone to access a first calling service provider for applying a first billing rate to calls made from the cellular phone when situated within the user zone;

(b) enabling a cellular telephone user to access a second calling service provider for applying a second billing rate to calls made from the cellular telephone when the cellular telephone is situated outside the user zone.

24. The method of claim 23 further comprising the step of enabling the subscriber to select first and second cellular calling service providers.

25. The method of claim 23 further comprising the step of enabling the subscriber to select first and second calling service PIC providers.

26. The method of claim 2 further including the following steps:

(a) storing the service profile at a home MTSO;

(b) coupling the user zone to a user zone MTSO;

(c) receiving a signal at a user zone MTSO from a cellular telephone specifying the identity of the cellular telephone and the identity of the home MTSO;

(d) the user zone MTSO retrieving the service profile from the home MTSO;

(e) the user zone MTSO determining whether or not the cellular telephone is authorized for any user zone among the user zones of the user zone MTSO with reference to the user zone specification;

(f) the user zone MTSO determining whether or not the cellular telephone is located within any user zone for which the cellular telephone is authorized; and (g) if the cellular telephone is located in a user zone for which it is authorized, the user zone MTSO selectively modifying at least a portion of the calling service feature specification of the service profile.

27. The method of claim 26 wherein the user zone MTSO is the home MTSO.

28. The method of claim 26 wherein the user zone MTSO is not the home MTSO.

29. The method of claim 2 further including the following steps:

(a) storing the service profile at a home MTSO;

(b) coupling the user zone to a user zone MTSO;

(c) receiving a signal at a user zone MTSO from a cellular telephone specifying the identity of the cellular telephone and the identity of the home MTSO;

(d) the user zone MTSO retrieving the service profile from the home MTSO;

(e) the user zone MTSO determining whether or not the cellular telephone is located within any user zone for which the cellular telephone is authorized; and (f) if the cellular telephone is located in a user zone, the user zone MTSO selectively modifying at least a portion of the calling service feature specification of the service profile.

30. The method of claim 29 wherein the user zone MTSO is the home MTSO.

31. The method of claim 29 wherein the user zone MTSO is not the home MTSO.

32. In a system having a first cell site defining a first user zone, a second cell site not in the user zone, and a mobile telephone switching office (MTSO) coupled to the first cell site, a method of selectively modifying a service profile for a cellular telephone based upon the geographic location of that cellular telephone, the service profile including (i) an identification number identifying the cellular telephone, and (ii) a calling service feature specification indicative of whether or not each of one or more cellular telephone calling service features are to be performed, and/or specifying one or more operating parameters for cellular calling service, said method including the following steps:

(a) directing the MTSO to modify at least a portion of the calling service feature specification of the service profile for the cellular telephone site if communications are established between the cellular telephone and the first cell site in preparation for using the modified calling service feature specification for communications between the cellular telephone and the first cell;

(b) directing the MTSO to use the calling service feature specification of the service profile for the cellular telephone if communications are established between the cellular telephone and the second cell site, so that the MTSO does not modify the calling service feature specification of the service profile when communications are established between the cellular telephone and the second cell site.

33. In a system having a first cell site defining a first user zone, a second cell site not in the user zone, and a mobile telephone switching office (MTSO) coupled to the first cell site, a method of selectively modifying a service profile for a cellular telephone based upon the geographic location of that cellular telephone, the service profile including (i) an identification number identifying the cellular telephone, and (ii) a calling service feature specification indicative of whether or not each of one or more cellular telephone calling service features are to be performed, and/or specifying one or more operating parameters for cellular calling service, said method including the following steps:

(a) directing the MTSO to use the calling service specification of the service profile for the cellular telephone if communications are established between a cellular telephone and the first cell site, so that the MTSO does not modify the calling service feature specification of the service profile when communications are established between the cellular telephone and the first cell site; and (b) directing the MTSO to modify at least a portion of the calling service feature specification of the service profile if communications are established between the cellular telephone and the second cell site in preparation for using the modified calling service feature specification for communications between the cellular telephone and the second cell site.

34. A system for selectively modifying a service profile for a cellular telephone if the cellular telephone is situated within a user zone, the user zone including one or more cells, microcells, picocells, cell sectors, picocell sectors, and/or microcell sectors, the service profile including (i) an identification number uniquely identifying the cellular telephone, and (ii) a calling service feature specification indicative of whether or not each of one or more cellular telephone calling service features are to be performed and/or setting forth one or more operating parameters for cellular service, the system including:

(a) a user zone MTSO coupled to the user zone and adapted for coupling to a second MTSO via an MTSO communications link, the user zone MTSO including (i) a receiving device for receiving a service profile from the second MTSO; (ii) a user zone MTSO processor coupled to the receiving device; and (iii) a location determining device for determining whether or not the cellular telephone is situated within the user zone;

wherein the user zone MTSO processor, in response to the location determining device determining that the cellular telephone is situated within the user zone, selectively modifying at least a portion of the calling service specification of the service profile.

35. In a cellular telephonic communications system, a method of providing location-dependent cellular service including the following steps:

(a) providing access to a first cellular service profile from a first set of locations; and (b) providing access to a second cellular service profile from a second set of locations;

wherein the first and second cellular service profiles each include (i) an identification number identifying a cellular telephone, and (ii) a calling service feature specification indicative of whether or not each of one or more cellular telephone calling service feature are to be performed and/or setting forth one or more operating parameters for cellular calling service; and wherein the first and second sets of locations are each defined with reference to the boundaries of one or more microcells, picocells, cells, microcell sectors, picocell sectors, and/or cell sectors.

36. In a system having a first cell site defining a first user zone, a second cell site not in the user zone, and a mobile telephone switching office (MTSO) coupled to the first cell site, a method of selectively modifying a service profile for a cellular telephone based upon the geographic location of that cellular telephone in a user area in which the cellular telephone is not authorized, the service profile including (i) an identification number identifying the cellular telephone, and (ii) a calling service feature specification indicative of whether or not each of one or more cellular telephone calling service features are to be performed, and/or specifying one or more operating parameters for cellular calling service, said method including the following steps:

(a) directing the MTSO to modify at least a portion of the calling service feature specification of the service profile for the cellular telephone if communications are established between a cellular telephone and the first cell site when the cellular telephone is in an area where the cellular telephone is not authorized, in preparation for using the modified calling service feature specification for communications between the cellular telephone and the first cell;

(b) directing the MTSO to modify at least a portion of the calling service feature specification of the service profile for the cellular telephone site if communications are established between a cellular telephone and the second cell site when the cellular telephone is in an area where the cellular telephone is not authorized, in preparation for using the modified calling service feature specification for communications between the cellular telephone and the second cell.

37. Programmable wireless communications control apparatus for providing location-dependent wireless communications services in at least one user zone applicable to wireless communications for a given subscriber, each user zone including one or more cells, microcells, picocells, cell sectors, microcell sectors, and/or picocell sectors, said apparatus comprising:

a first and a second set of calling service features wherein the first set of features is not identical to the second set of features;

means for enabling the first set of calling service features for a cellular telephone when the cellular telephone is situated in a given user zone; and means for enabling the second set of calling service features for a cellular telephone when the cellular telephone is situated outside the user zone.

38. Programmable wireless communications control apparatus for providing location-dependent wireless communications services in at least one user zone, said user zone applicable to wireless communications for a given subscriber, each user zone including one or more cells, microcells, picocells, cell sectors, microcell sectors, and/or picocell sectors, said apparatus comprising:

memory for storing the identity of a first calling service provider having a first billing rate and a second calling service provider having a second billing rate;

means for enabling a cellular telephone to access the first calling service provider so that the first billing rate is applied to calls made from the cellular telephone when the cellular phone is situated in the user zone; and means for enabling a cellular telephone to access the second calling service provider so that the second billing rate is applied to calls made from the cellular telephone when the cellular phone is situated outside the user zone.

* * * * *